US009342963B1

(12) United States Patent
McGraw, IV et al.

(10) Patent No.: US 9,342,963 B1
(45) Date of Patent: May 17, 2016

(54) GEO-SPATIAL-AWARENESS-BASED MONITORING, NOTIFICATION AND MAINTENANCE FOR SELF SERVICE TERMINALS

(75) Inventors: William H. McGraw, IV, Charlotte, NC (US); Richard L. Fitzgerald, Davidson, NC (US); Matthew K. Bryant, Gastonia, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/086,526

(22) Filed: Apr. 14, 2011

(51) Int. Cl.
*G07F 19/00* (2006.01)

(52) U.S. Cl.
CPC ...................... *G07F 19/00* (2013.01)

(58) Field of Classification Search
CPC ... G06Q 20/18; H04L 47/2408; H04W 40/10; G08C 2201/51; G07F 19/00
USPC .......................................................... 705/43
See application file for complete search history.

(56) References Cited

U.S. PATENT DOCUMENTS

| | | | | |
|---|---|---|---|---|
| 6,085,177 | A * | 7/2000 | Semple et al. ................... | 705/43 |
| 6,757,287 | B1 * | 6/2004 | Deml et al. ................. | 370/395.7 |
| 7,533,802 | B1 * | 5/2009 | McGinley et al. ............ | 235/379 |
| 7,630,721 | B2 * | 12/2009 | Ortiz .......................... | 455/456.1 |
| 7,778,937 | B2 * | 8/2010 | Ferrara et al. ................. | 705/304 |
| 7,815,103 | B2 * | 10/2010 | Timmis et al. ................ | 235/376 |
| 2002/0002467 | A1 * | 1/2002 | Ho .................................... | 705/1 |
| 2002/0082994 | A1 * | 6/2002 | Herziger .......................... | 705/43 |
| 2004/0034456 | A1 * | 2/2004 | Felke et al. ...................... | 701/29 |
| 2007/0282656 | A1 * | 12/2007 | Battcher et al. ................... | 705/8 |
| 2008/0121692 | A1 * | 5/2008 | MacPhail et al. .............. | 235/379 |
| 2009/0037310 | A1 * | 2/2009 | Claypoole et al. .............. | 705/35 |
| 2009/0212104 | A1 * | 8/2009 | Smith et al. .................... | 235/379 |
| 2010/0030839 | A1 * | 2/2010 | Ceragioli ................ | H04L 63/20 709/201 |

FOREIGN PATENT DOCUMENTS

GB          2478840 A    *   9/2011            G07F 19/20

OTHER PUBLICATIONS

When ATMs Malfunction; by Bankrate.com; 2 pages ; 2009.*

* cited by examiner

*Primary Examiner* — Elda Milef
*Assistant Examiner* — Mary Gregg
(74) *Attorney, Agent, or Firm* — Weiss & Arons LLP; Michael A. Springs, Esq.

(57) ABSTRACT

The present disclosure provides systems and methods for implementing a self-service terminal ("SST") monitoring, notification and maintenance system. Embodiments of the proposed invention may simplify a task of locating an operational SST having a specific operational status and/or capability within a geographic area. Embodiments may automatically determine and monitor an operational status and/or capabilities of a SST. The operational status may include an operational status indicative of a SST that need servicing or repair. A location of a device used to submit a request for SST information may be automatically determined. Location, operational status and directions on how to locate a specific SST within a distance of the determined location may be transmitted in response to a request for SST information. The operational status of multiple SSTs within a geographic area may be monitored.

11 Claims, 3 Drawing Sheets

GEO-SPATIAL-AWARENESS-BASED MONITORING, NOTIFICATION AND MAINTENANCE FOR SELF SERVICE TERMINALS

FIELD OF TECHNOLOGY

Aspects of the invention relate to providing a monitoring, notification and maintenance system for a self-service terminal (hereinafter "SST").

BACKGROUND OF THE INVENTION

SSTs may provide customers a variety of automated services at convenient and accessible locations. For example, a SST may provide a customer an ability to print airline boarding passes, purchase train tickets or food items.

As a further example, a SST may provide a customer access to bank account information, to deposit funds and to withdraw funds. Such SSTs are usually located in a variety of locations, some of which are remote from banking centers. For example, SSTs may be placed on street corners, in convenience stores, supermarkets or sports arenas.

A customer may have a preference for a SST with a particular characteristic. For example, a SST characteristic may include a functional capability of the SST.

In the context of a SST that provides access to banking information, a customer may desire a SST that is able to execute check processing, cash dispensing, printing of statements or receipts, accept envelope deposits and/or enable the deposit or withdrawal of coins.

A customer may also desire to use a SST supported by a particular institution. For example, a customer with funds deposited with bank A may desire to use SSTs supported by bank A. The customer may desire to use SSTs supported by bank A at least because such SSTs enable the customer to utilize multiple SST features without incurring one or more service fees.

However, because of the variety of locations at which SSTs are located, a customer may be unaware of the SST location(s) of a SST with desired characteristics.

Furthermore, a customer vacationing in an unfamiliar location may desire a SST with particular characteristics. The customer, unfamiliar with the location, may be unaware of the location of the SST(s) with the particular characteristics desired.

Thus, it is desirable to provide systems and methods for a monitoring system that monitors SST characteristics, accepts customer requests seeking a nearby SST with particular characteristics, determines the location of the customer, and guides the customer to a SST with the particular characteristics.

Furthermore, even if a customer is aware of the location of a SST that he desires to use, the customer may still wish to be certain that the SST is fully operational prior to traveling to the SST.

Thus, it is further desirable to provide systems and methods that will electronically monitor and inform a customer of the operational status of one or more SSTs.

In addition to customers, a SST technician may wish to ascertain SST characteristics. Currently, technicians are dispatched upon notification that a SST is malfunctioning. It would be desirable to notify a technician that a SST may be in need of predictive maintenance. Predictive maintenance is maintenance or servicing performed on a currently operational SST that may prevent a future malfunctioning of the SST.

Additionally, upon completion of a service call at a SST, the technician may desire to submit a request to a monitoring system inquiring whether there are other SSTs in the same vicinity that may require service. Furthermore, upon ascertaining that there is an additional SST that may require service, the technician may desire to be sent directions on how to reach the additional SST from the technician's current location.

Additionally, on occasion, upon completion of a SST service call, a SST technician may desire to confirm that the serviced SST is associated with a correct operational status.

Thus, it is desirable to provide systems and methods to verify that a recently repaired SST is functioning properly and classified as such. It is also desirable to enable a SST technician to submit a request to a monitoring system to determine if there are other SSTs in a technician's vicinity that may require service. It is further desirable to provide systems and methods to determine the location of a technician, and respond accordingly with location of or directions to a SST in need of service.

Accordingly, systems and methods for implementing a monitoring, notification and maintenance system are provided. The monitoring system may determine the status, features and location of a SST and convey relevant, current SST characteristics in response to a request submitted to the monitoring system.

SUMMARY OF THE INVENTION

It is an object of this invention to provide systems and methods for implementing a monitoring, notification and maintenance system for determining and conveying a current status, specific capabilities or location of a SST. Embodiments of the monitoring system may increase the convenience of locating a SST with desired characteristics.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
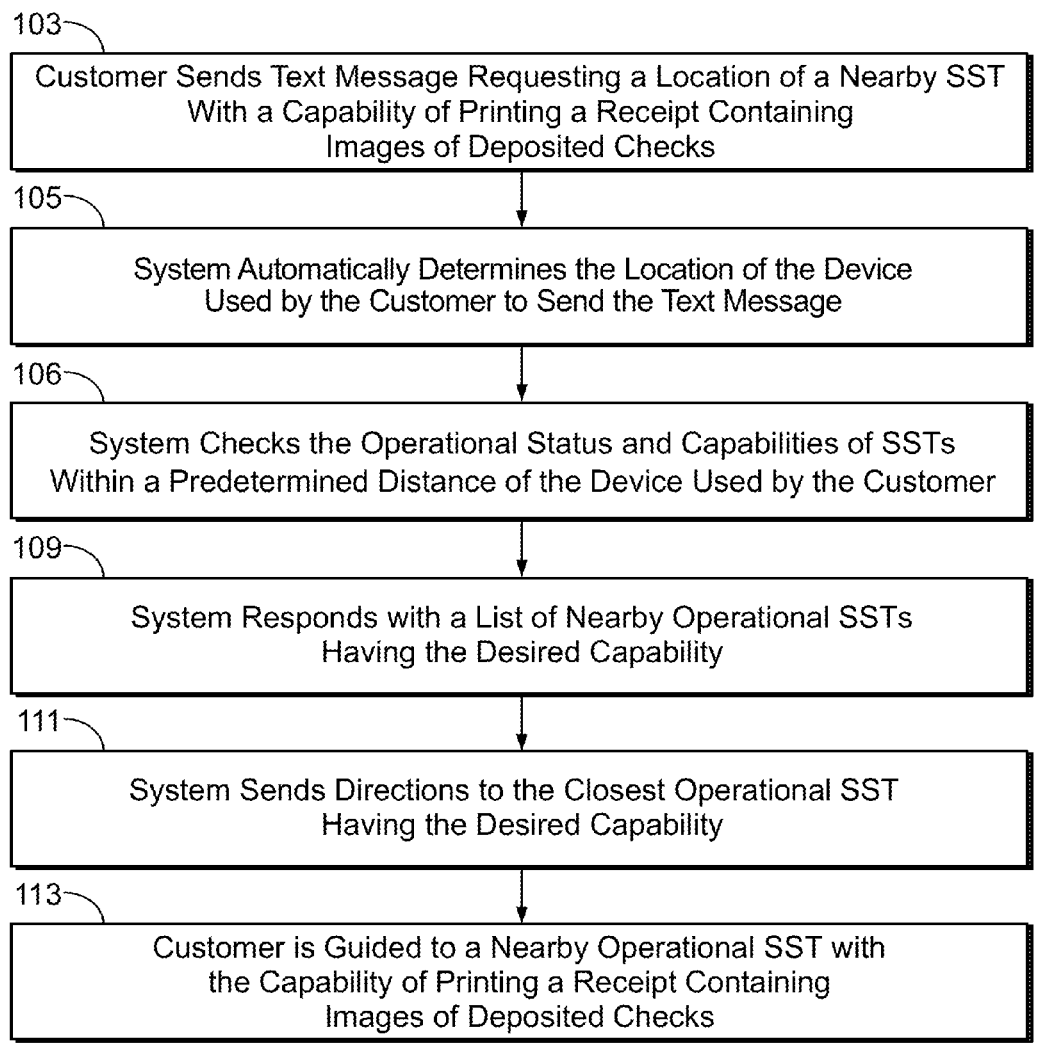
FIG. 1 shows an illustrative flow diagram of a process in accordance with the systems and methods of the invention.

Systems and methods for providing a SST monitoring, notification and maintenance system are provided. Embodiments of the current invention preferably simplify locating an operational SST with desired characteristics.

The monitoring system may be a computer software application. The monitoring system may consist of a central component run from a central location. The monitoring system may include multiple components run from different locations.

In some embodiments, the monitoring system according to the invention may include one or more SST components and a central component. A SST component of the monitoring system may be installed on a local SST.

The SST component may transmit local SST information from the local SST to the central component of the monitoring system. The central component may receive SST information from one or more SST components and organize the received information in a central database.

The central database may further perform correlation calculations in response to a customer request for SST information. The database may correlate a determined location of the requesting customer with an operational status of a selected, preferably proximal, SST.

In some embodiments, the monitoring system may monitor one or more SST characteristics. SST characteristics monitored may include SST location, operational status, functional capabilities, operational status of functional capabilities or other characteristics.

For example, the monitoring system may detect a SST malfunction by monitoring generation of a SST error code. In the event that the monitoring system detects a SST error code, the monitoring system may make an entry in a database indicating that a particular SST has exhibited a malfunction. It should be noted that an error code may be a code generated by a SST in the event that a SST encounters an operational problem. For example, a SST may generate an error code if a SST operating system crashes.

In an exemplary embodiment, a monitoring system may detect that a SST has generated an error code corresponding to a critical SST function. Upon detection of the generated error code, the monitoring system may subsequently flag the SST as malfunctioning. In the event that a customer requests SST information relating to the flagged SST, the monitoring system may transmit information to the customer indicating that the SST is malfunctioning.

Additional SST characteristics monitored by the monitoring system may include SST capabilities or an operational status of the SST capabilities. Exemplary SST capabilities monitored by the monitoring system may include check processing, cash dispensing, statement or receipt printing, envelope depositing, coin dispensing or coin depositing. The monitoring system may further monitor an operational status of a SST capability.

The monitoring system may further monitor an estimated amount of time that a customer may need to wait to use a SST. For example, the monitoring system may monitor how many people are on a line waiting to use a SST. The length of the line may be estimated based on historical data.

Characteristics of a SST may be manually compiled. For example, the location of one or more SSTs may be separately complied and imported or linked to the monitoring system. In some embodiments, the monitoring system may monitor a location of a SST. For example, a SST location may be determined by a GPS module within or attached to the SST. It should be noted that any other suitable method may be used to determine a SST location.

In some embodiments, SST characteristics may be monitored by receiving information regularly transmitted from a SST. For example, a SST may generate signals indicative of a specific capability. The monitoring system may be configured to detect the generated signals and make an entry in a database corresponding to the detected SST capability.

In some embodiments, the monitoring system may monitor SST characteristics by periodically querying a SST. The monitoring system may query a SST based on a geographic location of the SST. The monitoring system may submit a query to a network of SSTs. The query to a network of SSTs may ask only SSTs meeting specified criteria to respond to the query. The specified criteria may include a geographic location such as a zip code. The periodic query may ask a SST to provide information regarding its characteristics. A periodic query may be sent in response to receiving a customer request for SST information.

For example, in response to a customer request for SST information within a zip code, the monitoring system may send a query to a SST located within the specified zip code asking the SST to transmit its operational status or capabilities. The SST may respond to the query by indicating its current operational status or capabilities.

It should be noted that in the event that a SST has not responded to a query as anticipated or does not respond at all, the monitoring system may flag the SST as malfunctioning. Thus, in the event that a customer requests information relating to the irresponsive SST, the monitoring system may notify the customer that the SST has malfunctioned.

The monitoring system may organize and store SST characteristics in a database. In response to a customer request for SST information, a component of the monitoring system may query the database. The database may perform correlation calculations to obtain relevant SST information to be transmitted to the requesting customer. In some embodiments, the correlation calculation may be performed on information received from a SST in a real-time response to a periodic query.

Because SST characteristics may be obtained via a real time response to a query sent to a SST, therefore, some embodiments of the monitoring system may not require a central database to store SST characteristics. A de-centralized system may perform a correlation between a customer request for SST information and SST characteristics monitored by the monitoring system. However, a periodic query sent from the monitoring system to a SST may ask only SSTs within a geographic location to respond. Thus the responses to the query may only contain "pre-sorted" SST characteristics of SSTs within the geographic location.

Information transmitted in response to a customer request for SST information may include a monitored SST characteristic. For example, in an exemplary embodiment, the monitoring system may receive a customer request for a location of a SST possessing a specific capability. The monitoring system may respond to the customer request by determining one or more SSTs having the specific capability. The monitoring system may then transmit to the customer the location of the one or more SSTs having the specific SST capability.

Information transmitted to the customer may include information relating to an operational status of the one or more SSTs. For example, the monitoring system may inform a customer that one or more SSTs are "out of service." The monitoring system may detail to the customer specific out of service SST capabilities. Thus, a customer may be informed that a specific SST will let him transfer funds between accounts but is unable to let him withdraw cash.

Knowledge of the operational status of the SST capabilities and/or expected wait time to use the SST prior to arriving at a SST may prevent customer frustration and waste of time.

The relevancy of the SST information transmitted to the customer may be based on criteria specified in a customer request for SST information or a customer attribute auto-detected by the monitoring system.

For example, a customer may transmit a request to the monitoring system seeking a SST at or near a specific location. In response, the monitoring system may transmit to the customer a list of SSTs nearby to the location specified by the customer and the expected wait time to use a particular SST.

The list of transmitted nearby SSTs may be SSTs within a predetermined distance of a location associated with a customer request for SST information. The pre-determined distance may user-defined or system-set. The monitoring system may transmit to the customer the current operational status or capabilities associated with SSTs within the predetermined distance.

The monitoring system may inform the requesting customer that a SST may be malfunctioning or "out of service." In some embodiments, if a specific SST capability is malfunctioning, the monitoring system may indicate the specific malfunctioning capability. The monitoring system may further inform the customer of one or more operational SSTs at a location closest to a location associated with the customer request. The monitoring system may only inform the customer of one or more operational SST locations having one or more capabilities requested by the customer.

In some embodiments, a malfunctioning SST may direct a customer to a nearby operational SST. For example, a customer may arrive at a SST seeking to deposit a check. If the customer arrives at a SST with a malfunctioning check deposit capability, the SST may inform the customer of a nearby SST with an operational check deposit capability.

The malfunctioning SST may inform the customer of operational SSTs using a display of the malfunctioning SST, a printed receipt, or by transmitting a notification to the customer's mobile device.

The monitoring system according to the systems and methods of the invention may include a web portal. The web portal may provide an interface for a customer to request SST information.

For example, the web portal may enable a customer to enter search criteria. A customer may specify a desired SST location, capability or search for SSTs that may require a usage fee.

The web portal may additionally display a response to a customer request for SST information. For example, the web portal may be configured to display one or more SSTs nearby to a specified location that do not require a usage fee. The web portal may be customized so only SSTs having specific characteristics are displayed.

For example, a customer may use the web portal to request SST information relating to a SST located within a particular zip code that includes the capability to scan deposited checks. The monitoring system, via the web portal, may respond to the customer request by graphically displaying to the user SST locations located within the particular zip code and/or within a distance of the particular zip code.

The monitoring system via the web portal may further display to the requesting customer a current operational status of SSTs that scan deposited checks at locations within a distance of or closest to the particular zip code. The system may display an estimated wait time for using a SST that that scans deposited checks.

Thus, a customer may be made aware of SST malfunctions prior to arriving at a SST. Furthermore, a customer may be informed of where a nearby operational SST with a desired capability may be found, and how long he may have to wait to use the SST.

In some embodiments, a customer may submit a request for SST information to the monitoring system by sending a text message from a mobile device. Within a body of the text message, the customer may indicate a desired SST location, capability, or other characteristic. The monitoring system may respond with SST information regarding a current operational status, capability or other characteristic of a SST within a distance of the desired location.

A customer may submit a request for SST information to the monitoring system via a text message without indicating a desired location. The monitoring system may automatically determine a current location of the requesting customer and respond with relevant SST information. Relevancy may be based on the determined location of the requesting customer.

The monitoring system may determine a current location of the requesting customer using triangulation techniques. Triangulation techniques determine the approximate location of a mobile device based on strength of a communication signal received or emitted by a fixed antenna in a known location.

Based on the approximate location of a mobile device used to submit a request for SST information, the monitoring system may respond to the request with characteristics of SSTs located within a distance of the mobile device. The distance may be defined within the customer request or may be system defined. The distance may correspond to a SST closest to the approximate location of the mobile device.

The monitoring system may interact with a mobile device equipped with GPS technology. For example, a request for SST information may be submitted from a mobile device equipped with GPS technology. The request may pass GPS coordinates of the mobile device to the monitoring system. Based on the received coordinates, the monitoring system may determine a location of the mobile device within a few feet. A response to the customer request may provide SST location, status, capability or other characteristic within a distance of the determined location of the mobile device. The distance may be defined by the request or may be system defined. The distance may correspond to a SST location closest to the location of the mobile device.

In some embodiments, the monitoring system may display SST locations and/or characteristics superimposed on a map of a region surrounding a determined location of a mobile device or a location specified by the customer.

The monitoring system may preferably provide directions to an operational SST with characteristics requested by a customer. In some embodiments, the starting point of directions to a SST may be a determined location of a mobile device. The starting point of the directions may be a location of a mobile device used to submit a request for SST information. The location of the mobile device may be determined using triangulation techniques, GPS technology or any suitable method.

The directions may direct a customer to a nearby operational SST with a specific capability desired by the customer. Directions may include instructions on how to reach a SST by car, by bicycle, by public transportation or on foot.

Any suitable technology may be used to auto-detect a current location of a customer submitting a request for SST information. For example, the approximate location of a customer submitting a request over the internet may be ascertained by examining the IP address of the internet connected device used by the customer.

The monitoring system may monitor travel of a customer toward or away from a SST. For example, if a customer is carrying a mobile device equipped with GPS technology, the monitoring system may guide the customer step by step until the customer reaches a nearby operational SST.

In some embodiments, the monitoring system may include an interface accessible to SST technicians. Via an interface such as a web portal, the technician may remotely access SST information monitored by the monitoring system.

For example, based on a determined or specified location, the monitoring system may transmit to a SST technician operational status of SSTs within a distance of the determined or specified location.

A SST characteristic such as operational status may indicate that a SST requires service by a technician. For example, a SST that has generated an error code may be logged by the monitoring system and flagged as requiring service by a technician.

As a further example, a SST may be flagged for service based on an estimated or known need for routine or predictive maintenance. Routine or predictive maintenance may prevent a failure or malfunction of a SST.

In some embodiments, the monitoring system may further prioritize classes of malfunctions and assign a priority value to SSTs indicating which SST should be serviced first. The priority may be based on an error code, location or severity of a malfunction.

A technician may specify a geographic location in a request for SST information. The technician may submit a request for operational status information via a text message. The text message may be sent from a mobile device. The monitoring system may auto-detect a current location of the mobile device.

The location of a technician may be determined using triangulation techniques to locate a technician's mobile device. The location of a technician may preferably be determined using GPS technology to locate a technician's mobile device. Any suitable technology may be used to auto-detect a current location of a technician.

A SST in need of service may be the SST currently being serviced by the technician. For example, a technician that is repairing a malfunctioning capability of a SST may be informed that a component of the SST is in need of predictive maintenance. Such notification may help prevent SST malfunctions and/or reduce SST downtime.

The monitoring system may respond to a technician's request for SST information by transmitting SST information regarding one or more SSTs within a distance of a specified or auto-detected location.

After a technician completes servicing a SST, the monitoring system may detect that a SST error code has been cleared. Once the error code has been cleared, in response to future requests for SST information, the monitoring system may indicate that the SST is now operational. The technician may submit a request to the monitoring system to verify that a recently repaired SST is now associated within the monitoring system with a correct operational status.

The monitoring system may auto-detect the presence of a technician within a defined distance of a malfunctioning SST. For example, the monitoring system may track the location of a technician carrying a GPS equipped device. A digital signature of the GPS device may be associated with a SST technician.

The monitoring system may initiate a communication with a SST technician via a tracked device and direct the technician to a malfunctioning SST and/or a SST in need of predictive maintenance. The SST in need of service may be a SST within a distance of the detected location of the device associated with the technician.

The monitoring system may initiate a communication to a technician in the vicinity of a recently repaired SST indicating other nearby SSTs that may require service or repair. In some embodiments, the technician may initiate a request seeking SSTs within a vicinity of the technician that need service or repair.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
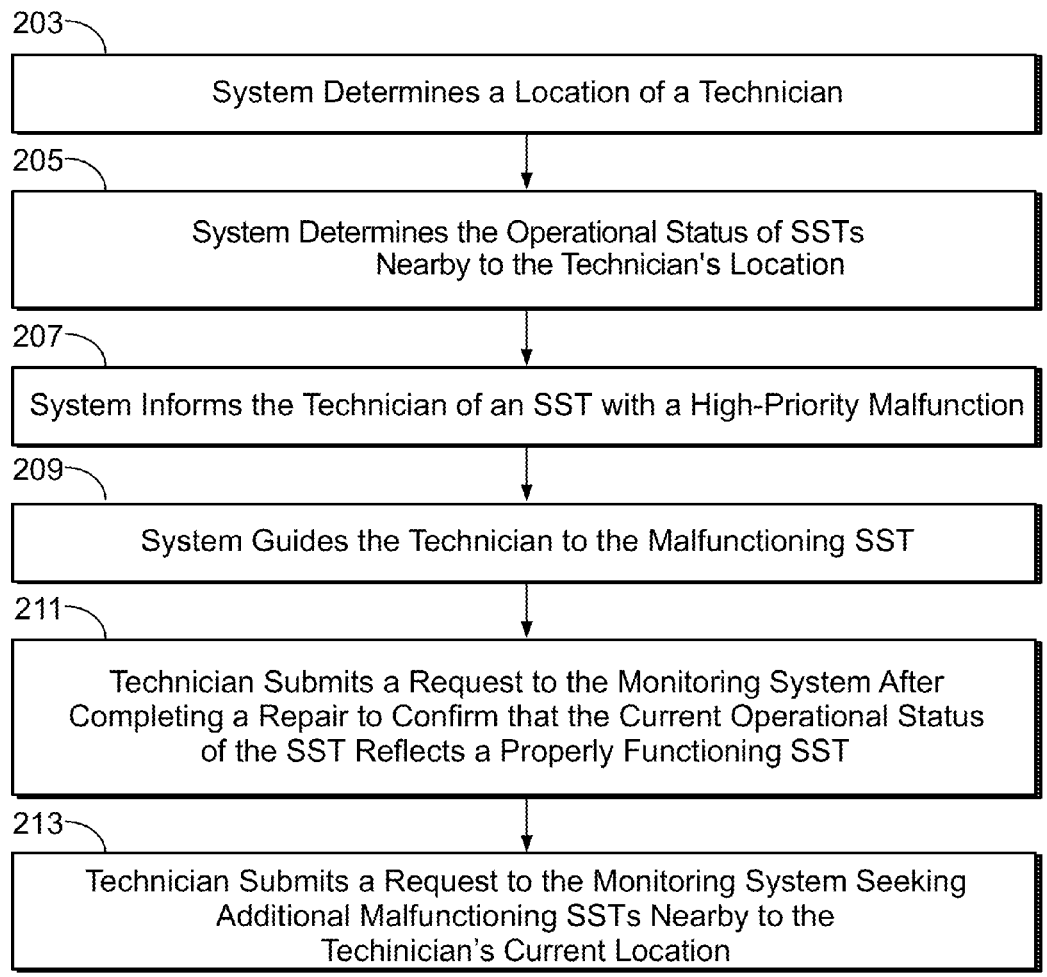
FIG. 2 shows another illustrative flow diagram of a process in accordance with the systems and methods of the invention.
Figure 3:
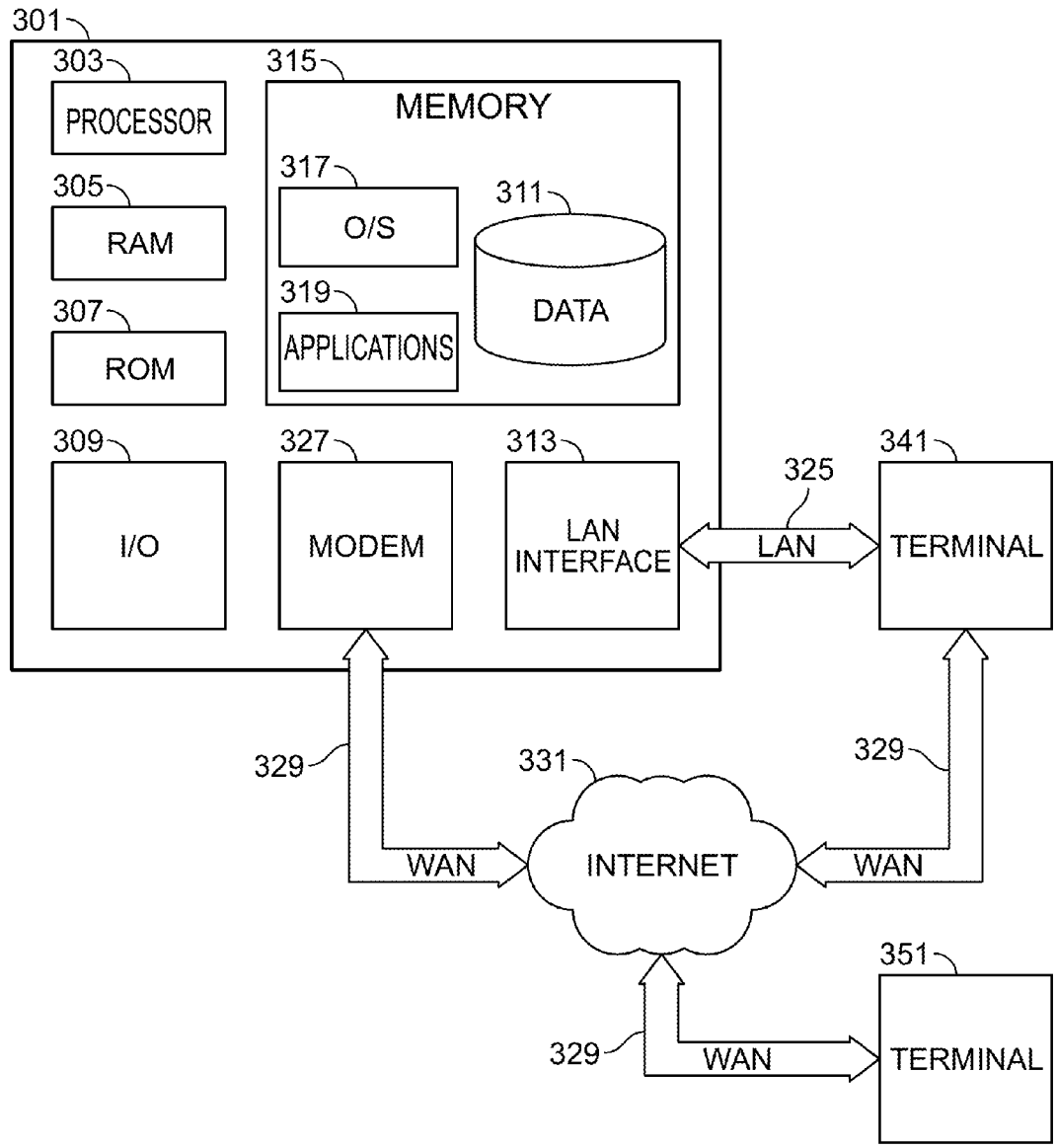
FIG. 3 shows a schematic diagram of a general purpose digital computing environment in which one or more aspects of the present invention may be implemented.

Processes in accordance with the principles of the invention may include one or more features of the processes illustrated in FIGS. 1-2. For the sake of illustration, the steps of the processes illustrated in FIGS. 1-2 will be described as being performed by a "system". The "system" may include one or more of the features of the apparatus that are shown in FIG. 3 and/or any other suitable device or approach. The "system" may be provided by an entity. The entity may be an individual, an organization or any other suitable entity.

FIG. 1 shows illustrative steps that may be performed by some embodiments of the invention. At step 103, a customer sends a text message from a mobile device requesting a nearby SST with a capability of printing a receipt containing images of deposited checks. Upon receiving the customer's request, at step 105, the system automatically determines the location of the device used by the customer to send the text message. The system may utilize GPS technology (not shown), triangulation techniques (not shown), or any other suitable technology for determining the location of the customer's mobile device.

At step 107, the system checks the operational status and capabilities of SSTs within a distance of the mobile device used by the customer. The system may query a database (not shown) containing current SST information or may ask SSTs (not shown) located within the determined location to transmit current SST information. At step 109, the system responds with a list of nearby operational SSTs having the desired capability. At step 111, the system sends directions to the closest operational SST having the desired capability. At step 113, the customer, guided by the directions, arrives at a nearby operational SST with the capability of printing a receipt containing images of deposited checks.

FIG. 2 shows illustrative steps that may be performed by some embodiments of the invention. At step 203, the system determines a location of a technician. The technician may manually input a current location or the system may automatically detect the location of a mobile device carried by the technician. At step 205, the system determines the operational status of SSTs nearby to the technician's current location. At step 207, the system informs the technician of a SST with a high priority malfunction. At step 209, the system guides the technician to the malfunctioning SST. The system may provide directions from the technician's current location and the directions may guide the technician step by step.

At step 211, the technician may submit a request to the monitoring system after completing a repair to confirm that the operational status of the "just repaired" SST is now properly recognized as an operational SST. At step 213, the technician may submit a request to the monitoring system seeking additional malfunctioning SSTs nearby to the technician's current location.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 3 illustrates a block diagram of a generic computing device 301 (alternatively referred to herein as a "server") that may be used according to an illustrative embodiment of the invention. The computer server 301 may have a processor 303 for controlling overall operation of the server and its associated components, including RAM 305, ROM 307, input/output module 309, and memory 315.

I/O module 309 may include a microphone, keypad, touch screen, and/or stylus through which a user of device 301 may provide input, and may also include one or more of a speaker for providing audio output and a video display device for providing textual, audiovisual and/or graphical output. Software may be stored within memory 315 and/or storage to provide instructions to processor 303 for enabling server 301 to perform various functions. For example, memory 315 may store software used by server 301, such as an operating system 317, application programs 319, and an associated database 311. Alternatively, some or all of server 301 computer executable instructions may be embodied in hardware or firmware (not shown). Database 311 may provide centralized storage of current SST characteristics. Database 311 may correlate customer request for SST information with stored SST characteristics.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 313. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 319 used by server 301 according to an illustrative embodiment of the invention may include computer executable instructions for invoking user functionality related to communication, such as email, short message service ("SMS"), and voice input and speech recognition applications.

Computing device 301 and/or terminals 341 or 351 may also be mobile terminals including various other components, such as a battery, speaker, and antennas (not shown).

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Thus, systems and methods for a SST monitoring system have been provided. Persons skilled in the art will appreciate that the present invention can be practiced by other than the described embodiments, which are presented for purposes of illustration rather than of limitation. The present invention is limited only by the claims that follow.

What is claimed is:

1. An automated teller machine ("ATM") comprising a computer system that performs a method for monitoring an operational status of each ATM on a network of ATMs wherein each of the ATMs on the network is associated with a discrete geographic location, the operational status comprising:
   functioning capabilities of each ATM on the network; and
   malfunctioning capabilities of each ATM on the network;
the method comprising:
   auto-detecting a location of a technician within a pre-determined distance of a first malfunctioning ATM on the network;
   identifying a second malfunctioning ATM that is within a pre-determined distance of the first malfunctioning ATM;
   prioritizing a severity of one or more malfunctioning capabilities of each malfunctioning ATM;
   based on the prioritizing, assigning a value to each malfunctioning ATM, the value corresponding to an order in which each malfunctioning ATM is to be serviced by the technician;
   configuring each malfunctioning ATM to:

activate a first communication link and establish communication with one or more other ATMs on the network;
transmit over the first communication link the one or more malfunctioning capabilities of each malfunctioning ATM to the one or more other ATMs on the network;
using the first communication link, request that the one or more other ATMs on the network communicate to each malfunctioning ATM whether the one or more other ATMs are operational with respect to the one or more malfunctioning capabilities of each malfunctioning ATM;
receive a response from the one or more other ATMs on the network that are operational with respect to the one or more malfunctioning capabilities of each malfunctioning ATM;
in response to receiving responses from the one or more other ATMs, display on each malfunctioning ATM during a standby state of each malfunctioning ATM:
a location of the one or more other ATMs that are within a pre-determined distance of the malfunctioning ATM and that are operational with respect to the one or more malfunctioning capabilities; and
an estimated wait-time for using the one or more ATMs that are operational with respect to the one or more malfunctioning capabilities;
activating a second communication link configured to dispatch the technician to each malfunctioning ATM based on the value assigned to each malfunctioning ATM;
wherein, when a customer attempts to access the first malfunctioning ATM or the second malfunctioning ATM, the method further comprises:
transmitting a notification to a mobile device of the customer showing the location of and directions to the one or more other ATMs that are within the pre-determined distance of the malfunctioning ATM and that are operational with respect to the one or more malfunctioning capabilities; and
when a printer is operational at the first malfunctioning ATM or at the second malfunctioning ATM, printing a receipt showing the location of and directions to the one or more other ATMs that are within the pre-determined distance of the malfunctioning ATM and that are operational with respect to the one or more malfunctioning capabilities.

2. The system of claim 1 further comprising machine executable instructions for, in response to auto-detecting the presence of the technician, identifying an operational ATM in need of predictive maintenance.

3. The system of claim 1 further comprising machine executable instructions for calculating directions from the first malfunctioning ATM to the second malfunctioning ATM.

4. The system of claim 3 further comprising machine executable instructions for:
monitoring a change in the location of the technician; and
recalculating directions to the second malfunctioning ATM based on the change.

5. The system of claim 1 wherein the operational status of each ATM on the network comprises an operational status of:
an ATM cash dispenser;
an ATM cash acceptor;
an ATM statement printer;
an ATM to scan checks; and
an ATM to print images of scanned checks.

6. The system of claim 1 wherein the auto-detecting the location of the technician comprises tracking GPS coordinates of a device associated with the technician.

7. The system of claim 1 wherein the machine executable instructions comprise machine executable instructions for:
monitoring imposition of a fee to use each ATM on the network; and
in response to a detection of the one or more malfunctioning capabilities, configuring each malfunctioning ATM to display the fee for using one or more operational ATMs that are within a pre-determined distance of the malfunctioning ATM.

8. An automated teller machine ("ATM") that performs a computer implemented method for remotely accessing an operational status of a plurality of other ATMs on a network, the method comprising using a computer system of the ATM:
monitoring an operational status of the plurality of other ATMs;
receiving a request for ATM information from a device associated with a technician;
in response to receiving the request, determining a geographic location of the device used to transmit the request for ATM information;
identifying a malfunctioning ATM associated with a malfunctioning capability within a pre-determined distance of the geographic location;
directing the technician to the malfunctioning ATM;
identifying an operational ATM in need of preventive maintenance within a pre-determined distance of the malfunctioning ATM;
before the technician arrives at the malfunctioning ATM, configuring the malfunctioning ATM to:
activate a communication link and establish communication with at least one other ATM on the network;
broadcast, over the communication link the malfunctioning capability to the at least one other ATM on the network;
use the communication link to request that the at least one other ATM on the network communicate to the malfunctioning ATM whether the at least one other ATM is operational with respect to the malfunctioning capability;
receive a response from the at least one other ATM on the network that it is operational with respect to the malfunctioning capability;
in response to receiving the response from the at least one other ATM, display, during a standby state, directions to the at least one other ATM that is operational with respect to the malfunctioning capability; and
directing the technician to the operational ATM in need of preventive maintenance after receiving confirmation that the malfunctioning capability of the malfunctioning ATM has been repaired;
wherein, when a customer attempts to access the malfunctioning ATM, the malfunctioning ATM is further configured to:
transmit a notification to a mobile device of the customer, the notification showing the location of the at least one other ATM that is within a pre-determined distance of the mobile device and that is operational with respect to the malfunctioning capability; and
when a printer of the malfunctioning ATM is operational, printing a receipt showing the location of the at least one other ATM that is within the pre-determined distance of the customer's mobile device and that is operational with respect to the malfunctioning capability.

9. The method of claim 8 wherein the further comprises configuring the malfunctioning ATM to display an estimated wait time to use the at least one other ATM.

10. The method of claim 8 wherein the method further comprises configuring the malfunctioning ATM to display a fee to use at least one of a plurality of capabilities of the at least one other ATM.

11. The method of claim 8 wherein, in the method, each of a plurality of ATM capabilities associated with the at least one other ATM is functional.

* * * * *